(12) United States Patent
Peli (10) Patent No.: US 10,628,994 B2
(45) Date of Patent: Apr. 21, 2020

(54) REDUCING VISUALLY INDUCED MOTION SICKNESS IN HEAD MOUNTED DISPLAY SYSTEMS

(71) Applicant: Google LLC, Mountain View, CA (US)

(72) Inventor: Eliezer Peli, Boston, MA (US)

(73) Assignee: GOOGLE LLC, Mountain View, CA (US)

( * ) Notice: Subject to any disclaimer, the term of this patent is extended or adjusted under 35 U.S.C. 154(b) by 73 days.

(21) Appl. No.: 15/912,887

(22) Filed: Mar. 6, 2018

(65) Prior Publication Data

US 2018/0261003 A1 Sep. 13, 2018

Related U.S. Application Data

(60) Provisional application No. 62/467,926, filed on Mar. 7, 2017.

(51) Int. Cl.
| | | |
|---|---|---|
| *G06T 15/20* | (2011.01) | |
| *G06T 15/08* | (2011.01) | |
| *G06F 3/01* | (2006.01) | |
| *G09G 3/00* | (2006.01) | |
| *G02B 27/01* | (2006.01) | |
| *G06F 3/147* | (2006.01) | |

(52) U.S. Cl.
CPC .......... *G06T 15/205* (2013.01); *G02B 27/017* (2013.01); *G06F 3/011* (2013.01); *G06F 3/012* (2013.01); *G06F 3/013* (2013.01); *G06F 3/147* (2013.01); *G06T 15/08* (2013.01); *G09G 3/001* (2013.01); *G09G 3/002* (2013.01); *G09G 2320/10* (2013.01)

(58) Field of Classification Search
CPC ..... G06T 15/08; G06T 15/205; G02B 27/017; G06F 3/011; G06F 3/012; G06F 3/013; G06F 3/147; G09G 3/001; G09G 3/002; G09G 2320/10
See application file for complete search history.

(56) References Cited

U.S. PATENT DOCUMENTS

| | | | | |
|---|---|---|---|---|
| 2004/0102713 | A1* | 5/2004 | Dunn | .................. G02B 27/017 600/558 |
| 2008/0079753 | A1* | 4/2008 | Victor | .................. G01C 21/365 345/660 |

(Continued)

OTHER PUBLICATIONS

Ajoy S. Fernandes and Steven K. Feiner, "Combating VR Sickness Through Subtle Dynamic Field-of-View Modification," IEEE Symposium on 3D User Interfaces, Mar. 19-23, 2016, Greenville, SC, USA, 10 pages.

*Primary Examiner* — Amare Mengistu
*Assistant Examiner* — Jennifer L Zubajlo (57) ABSTRACT

A head mounted display (HMD) for displaying images to a user includes a sensor unit configured to detect motion of a head of the user of the HMD. The HMD also includes one or more processors configured to, in response to the motion, reduce contrast in a peripheral area of an image displayed to the user from an original contrast of the image, the image having a foveal area and the peripheral area relative to the optical axis of the eye of the user, the contrast being least reduced in a first portion of the peripheral area closest the foveal area and being most reduced in a second portion of the peripheral area farthest from the foveal area.

20 Claims, 5 Drawing Sheets

(56) References Cited

U.S. PATENT DOCUMENTS

| | | | | |
|---|---|---|---|---|
| 2015/0338915 A1* | 11/2015 | Publicover | ............ | G06F 21/64 |
| | | | | 345/633 |
| 2016/0131908 A1* | 5/2016 | Fateh | ............ | G06F 3/147 |
| | | | | 345/633 |
| 2016/0328884 A1* | 11/2016 | Schowengerdt | ......... | G02B 6/32 |
| 2017/0169602 A1* | 6/2017 | Blackmon | ............ | G06F 3/013 |
| 2018/0357780 A1* | 12/2018 | Young | ............ | G06T 7/66 |
| 2018/0357810 A1* | 12/2018 | Young | ............ | G06F 3/147 |

\* cited by examiner

REDUCING VISUALLY INDUCED MOTION SICKNESS IN HEAD MOUNTED DISPLAY SYSTEMS

CROSS-REFERENCE TO RELATED APPLICATIONS

The present application claims priority to Provisional U.S. Patent Application Ser. No. 62/467,926, entitled "Reducing Visually Induced Motion Sickness in Head Mounted Display Systems" and filed on 7 Mar. 2017, the entirety of which is incorporated by reference herein.

BACKGROUND

A virtual reality (VR) system replicates an environment that simulates physical presence in places in the real world or an imagined world using entirely-computer-generated three-dimensional (3D) imagery of "scenes" within this world. Similarly, an augmented reality (AR) system "augments" physical presence in the real world through computer-generated 3D imagery that overlies contemporaneously captured imagery of the real world. Thus, VR and AR systems both seek to provide an accurate sense of "presence" in the real, augmented, or imagined world. Typically, this sense of presence is facilitated through the use of a head-mounted display (HMD) or other user-portable display device that displays imagery that provides a two dimensional (2D) or 3D representation of a scene in the represented world, where the presented scene reflects the user's relative perspective of the scene based on the user's current pose (that is, the location and orientation of the user-portable display device relative to a reference coordinate frame for the depicted scene).

When a user with an HMD moves his or her head creating fast motion on the display, a mismatch between the vestibularly-sensed head movement and the corresponding visual effect can cause Visually Induced Motion Sickness (VIMS). VIMS is more severe with a wider field of view and less severe with a smaller field of view. Conventional methodologies reduce the field of view provided to the user of the HMD in order to reduce the possibility and/or severity of VIMS experienced by the user.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The following description is intended to convey a thorough understanding of the present disclosure by providing a number of specific embodiments and details involving display systems, particularly in the context of Virtual Reality (VR) and Augmented Reality (AR) systems utilizing head mounted display (HMD) devices. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-7 illustrate example systems and methods for addressing issues associated with Visually Induced Motion Sickness (VIMS) in VR and AR applications. When a user with a HMD moves his or her head, thereby creating fast motion on the display, a mismatch between the vestibularly-sensed head movement and the corresponding visual effect displayed on the HMD can cause VIMS. VIMS is more severe with a wider field of view and less severe with a smaller field of view. At the same time, presence is increased with a wider field of view and decreased with a smaller field of view. While reducing VIMS may be accomplished by reducing the field of view, the resulting reduced sense of presence is not desirable. Embodiments provided here reduce the field of view in order to balance the competing goals of reducing VIMS and providing immersive presence. Accordingly, the systems and methods described herein are example embodiments in which presence is maintained by lowering contrast on at least a portion of the display of a HMD or other display system in peripheral regions or areas from the outer edge of the foveal view to the outer edge of the peripheral view in response to detected head motion, thereby maintaining presence while reducing the possibility/severity of VIMS. The embodiments serve to maintain presence by continued display of the image in the full contrast foveal area and reduced from original contrast peripheral area/s. At the same time, these embodiments serve to reduce contrast in the peripheral area/s which serves to reduce the field of view to a degree which will lead to reduced incidence of VIMS.

Figure 1:
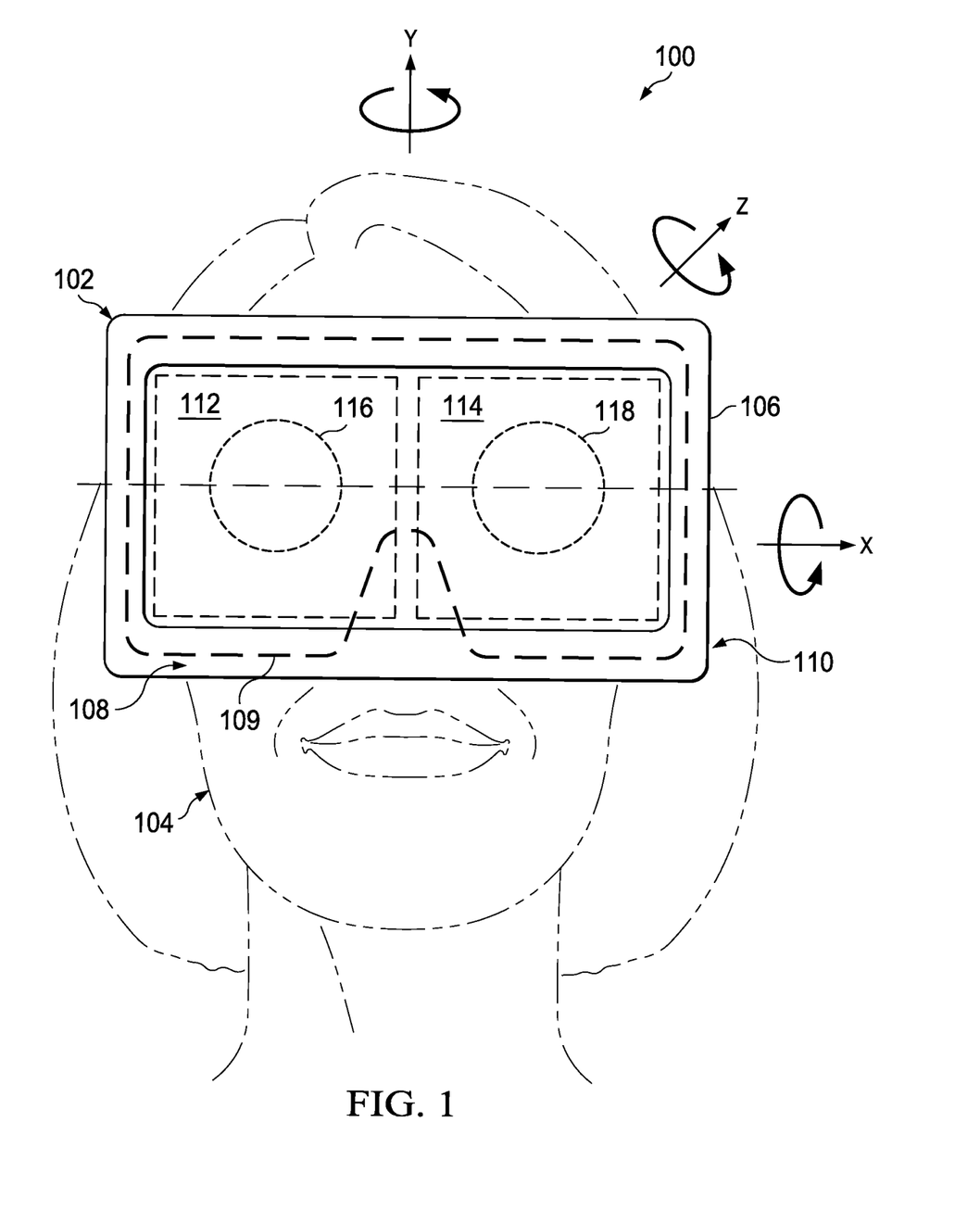
FIG. 1 is an example implementation of a VR system in accordance with some embodiments of the present disclosure.

FIG. 1 illustrates a display system 100 for providing VR or AR presence in the real world or an imagined world in accordance with at least one embodiment of the present disclosure. The display system 100 includes a user-portable display device 102 for displaying imagery of a 3D world that may comprise a VR scene or AR scene. For ease of illustration, the user-portable display device 102 is described in the example context of a HMD, and thus the user-portable display device 102 also is referred to herein as "HMD 102." However, in other embodiments, the user-portable display device 102 may comprise any of a variety of electronic devices that are user-portable and which facilitate display of stereoscopic or other 3D imagery, such as, for example, a tablet computer, a notebook computer, a smartphone, and the like.

The HMD 102 typically is coupled to the movements of a user's head 104 in some manner. Typically, as implied by the term "mounted" in "head mounted display" the HMD 102 includes an apparatus strapped to, or otherwise mounted on, the user's head 104 such that the HMD 102 is fixedly positioned in proximity to the user's face and thus moves with the user's movements. However, in some circumstances a user may hold a tablet computer or other hand-held device up to the user's face and constrain the movement of the hand-held device such that the orientation of the hand-held device to the user's head is relatively fixed even as the user's head 104 moves. In such instances, a hand-held device operated in this manner also may be considered an implementation of the HMD 102 even though it is not "mounted" via a physical attachment to the user's head 104.

The HMD 102 comprises a housing 106 having a surface 108 opposite another surface 110, as well as a face gasket 109 and set of straps or a harness (omitted from FIG. 1 for clarity) to mount the housing 106 on the user's head 104 so that the user faces the surface 108 of the housing 106. In the depicted embodiment, the HMD 102 is a binocular HMD and thus has a left-eye display 112 and a right-eye display panel 114 disposed at the surface 108. The displays 112, 114 may be implemented as separate display devices (that is independent display arrays driven by separate display driver hardware components) or the displays 112, 114 may be implemented as logically-separated regions of a single display device (e.g., a single display array logically divided into left and right "halves"). The housing 106 further includes an eyepiece lens 116 aligned with the left-eye display 112 and an eyepiece lens 118 aligned with the right-eye display panel 114. Alternatively, in some embodiments, the HMD 102 may be implemented as a monocular HMD in that a single image is presented to both eyes of the user, either through left and right eyepiece lenses 116, 118, or directly without an intervening lens.

As described in greater detail below, the display system 100 further includes a processing system to generate imagery for display at the HMD 102. In some embodiments, the components of the processing system are primarily implemented within the HMD 102 itself. For example, the HMD 102 may comprise a computing system that executes a VR/AR application and renders the resulting imagery, and the HMD 102 may be connected through a wireless or wired connection to a local or remote computing device that provides various data associated with the VR/AR application, such data describing objects to be rendered in a scene, the parameters of other users (e.g., location) operating in the same world space, and the like. In other embodiments, some or all of the components of the image rendering system are implemented external to the HMD 102, and the data representing the imagery for display may be supplied to the HMD 102 via a wired or wireless connection.

In operation, the display system 100 executes a VR or AR software application that manipulates one or more processors to determine the current pose (that is, position and rotational orientation) of the HMD 102 (and thus the user's head 104) relative to a reference coordinate frame of a represented 3D world and then generates imagery of a scene from a perspective associated with that pose. The displayed imagery may be completely computer-generated (that is, VR imagery), or the imagery may be a combination of imagery captured of the local environment (e.g., imagery captured via one or more image sensors mounted on the HMD 102) and an AR overlay that is rendered so as to reflect the current user pose. As shown in FIG. 1, in implementations with both a left-side display and a right-side display, left-eye-specific imagery may be rendered and displayed in the left-eye display 112 concurrent with the rendering and display of right-eye-specific imagery in the right-eye display panel 114, thereby enabling a stereoscopic 3D display of scene represented by the displayed imagery.

As the HMD 102 is mounted on the user's head 104, or otherwise constrained so as to move in concert with the user's head, the HMD 102 is subject to considerable movement during operation. As described above, this movement, when combined with the rendering and display latency of the display system 100, can result in substantial user disorientation or motion sickness unless otherwise mitigated. To this end, the display system 100 utilizes a process to reduce contrast of portions of the rendered imagery based on head motion of the user of the HMD 102.

Figure 2:
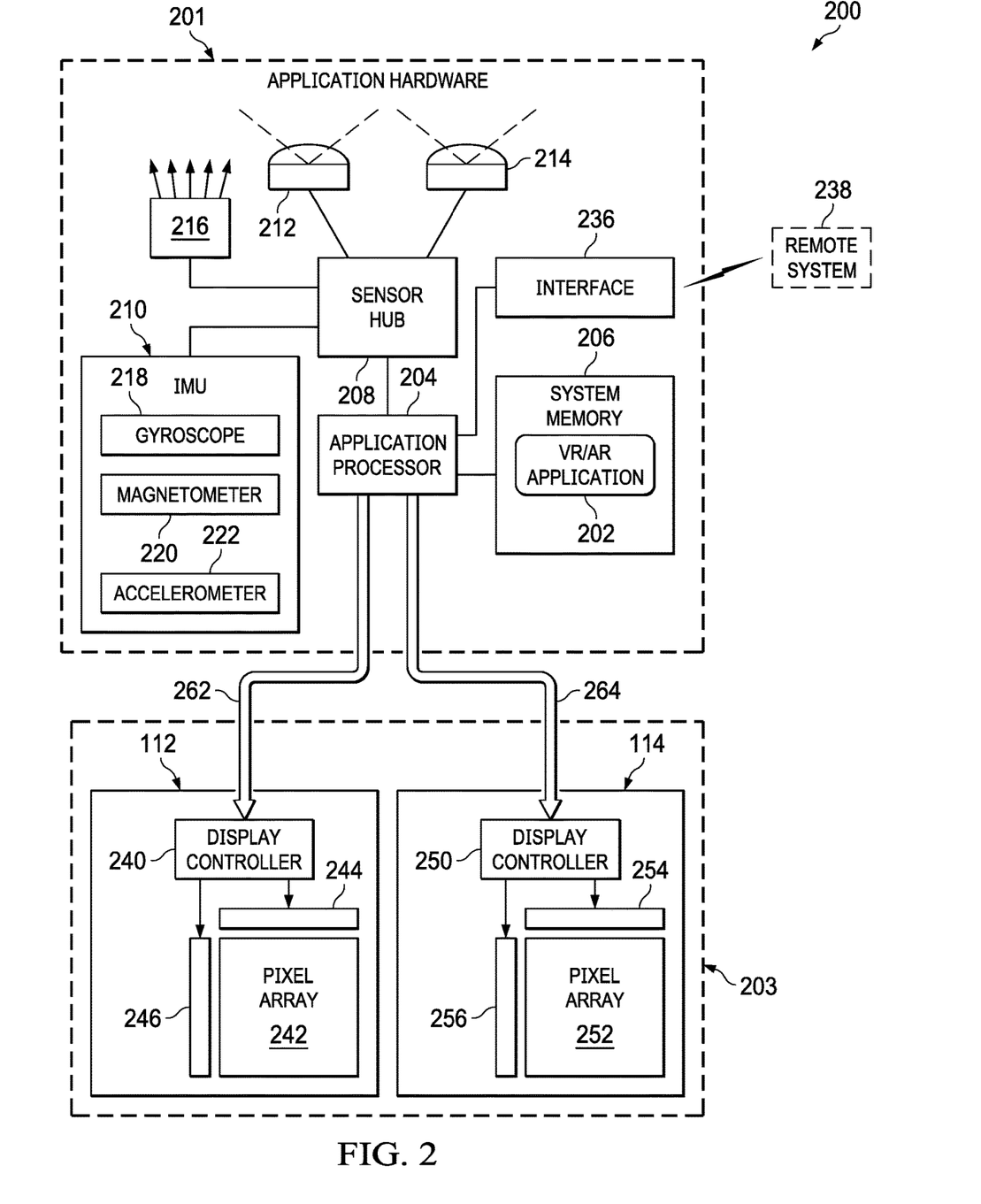
FIG. 2 is a diagram illustrating an image processing system of a foveated display system of the VR system of FIG. 1 in accordance with some embodiments of the present disclosure.

FIG. 2 illustrates an example processing system 200 of the display system 100 of FIG. 1 in accordance with at least one embodiment of the present disclosure. The processing system 200 includes application hardware 201 directed to the execution of a VR or AR application (referred to herein as "VR/AR application 202") so as to reduce contrast of portions of imagery to be rendered based on head motion of the user of the HMD device 102. The processing system 200 further includes the display hardware 203 directed to the display of the VR or AR content represented by a sequence of display frames or images on the basis of the current pose of the HMD 102. In an alternative embodiment, the processing system may not be implemented in the HMD itself, but instead in a computing system connected to the HMD.

In the depicted example, the processing system 200 includes an application processor 204, a system memory 206, a sensor hub 208, and an inertial management unit (IMU) 210. In some embodiments, the HMD 102 may incorporate image capture for purposes of visual localization or visual telemetry, or for real-time display of imagery captured of the local environment in support of AR functionality. In such embodiments, the processing system 200 further may include, for example, one or more image sensors 212, 214 and a structured-light or time-of-flight (ToF) depth sensor 216.

The IMU 210 comprises one or more inertial sensors to facilitate motion tracking and the tracking of the latest pose of the HMD 102, including, for example, a gyroscope 218, a magnetometer 220, and an accelerometer 222. The Sensortec™ BMI160 from Bosch Gmbh is an example of a commercially-available implementation of the IMU 210. The sensor hub 208 is coupled to the IMU 210, the imaging sensors 212, 214, and the depth sensor 216, and operates to manage the transfer of control signaling and data between the application processor 204 and the IMU 210, the imaging sensors 212, 214, the depth sensor 216, and other sensors of the display system 100. The Myriad™ 2 vision processing unit (VPU) from Movidius Ltd. is an example of a commercially-available implementation of the sensor hub 208. The application processor 204 comprises one or more central processing units (CPUs), graphics processing units (GPUs), or a combination of one or more CPUs and one or more GPUs. The Snapdragon™ 810 MSM8994 system-ona-chip (SoC) from Qualcomm Incorporated is an example of a commercially-available implementation of the application processor 204.

In the depicted example, the display hardware 203 includes the left-eye display 112, and the right-eye display panel 114. The left-eye display panel 112 of the HMD device 104 includes a display controller 240 and a pixel array 242 implementing an array of pixels arranged in rows and columns. Each pixel of the pixel array 242 may be implemented as a matrix of sub-pixels, such as a particular arrangement of red, green, or blue sub-pixels, each of which is controlled to emit light of the corresponding color at a corresponding luminance, and the combination of light colors and their luminance results in the intended brightness and color for the pixel as a whole. Examples pixel architectures for the pixels can include, for example, light emitting diodes (LEDs) and organic light emitting diodes (OLEDs). The left-eye display panel 112 further includes a column-control component 244 and a row-control component 246. The column-control component 244 includes pixel data buffers, line drivers, and column combination logic that together operate to control the pixels of the pixel array 242 on a column-by-column basis. Similarly, the row-control component 246 includes row select logic and row combination logic that together operate to control the pixels of the pixel array 242 on a row-by-row basis.

The column-control component 244 and row-control component 246 typically are implement as integrated circuitry on the display panel substrate that implements the pixel array 242, but in some implementations may be implemented as separate discrete hardware components. Likewise, the display controller 240 may be implemented as a discrete hardware component, such as one or more ASICs, field programmable gate arrays (FPGA) or other programmable logic devices implemented on a printed circuit board (PCB) or flex circuit, or may be implemented as circuitry integrated with the display panel substrate. The right-eye display panel 114 of the HMD device 102 is similarly configured with a display controller 250, a pixel array 252, a column-control component 254, and a row-control component 256.

The one or more application processors 204 are connected to the display panel 112 of the display hardware 203 via one or more physical layers (PHYs) 262 and to the display panel 114 of the display hardware 203 via one or more PHYs 234. The PHYs 232, 234 include the conductive wires, fiber optic lines or other electrical or optical signal conduction structures used to transmit signals between the hardware component implementing the application processor 204 and the display panels 112, 114, as well as the circuitry implementing the interfaces to these signal conduction structures at both the application processor 204 and the display panels 112, 114. Standardized examples of such PHYs include, but are not limited to, MIPI-DSI interconnects, DisplayPort or embedded DisplayPort interconnects, LVDS interconnects, and the likes.

In operation, the application processor 204 executes the VR/AR application 202 (stored in, for example, the system memory 206) to provide VR/AR functionality for a user. As part of this process, the VR/AR application 202 manipulates the application processor 204 to determine motion of the HMD 102 and based on detection of motion, reduces contrast of a portion of the image or frame displayed on the display.

In some embodiments, the application processor 204 obtains the current samples from the gyroscope 218, the magnetometer 220, and the accelerometer 222 of the IMU 210 and determines from these inertial sensor readings the occurrence of the motion by comparison of the current pose and rotation of the user's head to a prior arrangement of pose and rotation. Instead of, or in addition to, using the IMU 210 for determining the current pose and rotation, the application processor 204 may use the information from one or more imaging sensors 212, 214 or depth sensors 216 to determine, verify, or revise the current pose and rotation using one or more visual telemetry or simultaneous localization and mapping (SLAM) techniques. The VR/AR application 202 further may manipulate the application processor 204 to render images via the display hardware 203.

Alternatively, in some embodiments at least a portion of the rendering process according to the embodiments herein is offloaded to a remote system, rather than being performed at the HMD 102 itself. For example, in some embodiments, the processing system 200 may include an interface 236 coupled to a remote system 238, whereby the remote system 238 may be a computing system in the same room or local area as the HMD 102 and coupled to the HMD 102 via a wired or wireless local area connection (LAN) or personal area connection (PAN), or may be a remote server connected to the HMD 102 via one or more wired or wireless networks, such as the Internet. In such instances, the VR/AR application 202 may provide the remote system 238 with a representation of the current image, whereupon the remote system 238 determines the portions of the image for which to reduce contrast and then transmits that information to the HMD 102 for display by the display hardware.

As a general operational overview, one or more processors of the application hardware 201, including the one or more application processors 204, execute the VR/AR software application 202 stored in the system memory 206 to provide VR/AR functionality for a user of the HMD device 102. As part of this process, the VR/AR application 202 manipulates the one or more application processors 204 to render sequences of images for display at the display panels 112, 114, with the sequences of images representing a VR or AR scene based on provided display context information. The display context information can include information representing spatial characteristics of an AR or VR environment and objects contained therein, as well as sensor information regarding the pose of the HMD device 102 relative to the represented environment. As each image of a corresponding sequence is rendered, the application hardware 201 provides pixel data and corresponding control data for transmission to the corresponding one of the display panels 112, 114, whereupon the display controller of the corresponding display panel processes the received pixel data so as to drive the pixel array to display the imagery represented by the received pixel data.

Each image to be rendered is spatially partitioned into a foveal region that corresponds to a user's gaze direction with respect to the pixel array (e.g., pixel array 242 or 252) of the corresponding display panel on which the image is to be displayed, as well as one or more peripheral regions surrounding the foveal region. In response to motion of the HMD 102, the foveal region, being centered in the anticipated gaze direction, is rendered at an original contrast of the image to be displayed, while the one or more peripheral regions are rendered at one or more lower contrasts compared to the original contrast, with the contrast of each peripheral region generally decreasing with distance from the foveal region. When motion ceases, the imagery in both the foveal region and the one or more peripheral regions are rendered with the original contrast of the image to be displayed.

Figure 3:
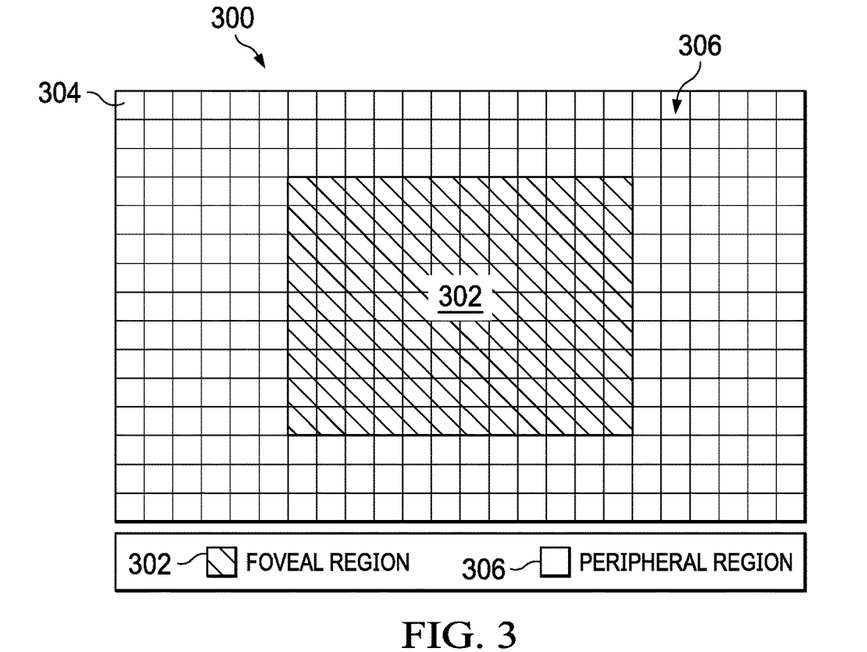
FIG. 3 is a diagram illustrating a foveated image having a foveal region and a single peripheral region in accordance with some embodiments of the present disclosure.

In some embodiments, this foveal region has a fixed position within each image of a sequence of images. For example, it may be expected that the user may primarily gaze at the center of the pixel array, and thus the foveal region may be set to a region of pixels centered around this center point of an image, which in turn corresponds to the center point of the pixel array upon which the image is intended to be displayed. To illustrate, FIG. 3 depicts an example pixel array 300 of an image in which a foveal region 302 comprises a subset of pixels 304. For example, the foveal region 302 may comprise a 9×12 subset array of pixels 304 in the illustrated position within the pixel array 300 and a single peripheral region 306 being defined as the remaining subset of pixels 304 of the pixel array 300. In response to motion of the HMD 102, the foveal region 302 is rendered at an original contrast of the image to be displayed, while the peripheral region 306 is rendered at lower contrast compared to the original contrast with the generally decreasing with distance from the foveal region. When motion ceases, the foveal region 302 and the peripheral region/s 306 are rendered with the original contrast of the image to be displayed. It should be noted that, for purposes of illustration, the sizes and resolution of the pixel array and corresponding subset regions are reduced compared to the typical implementation.

Figure 4:
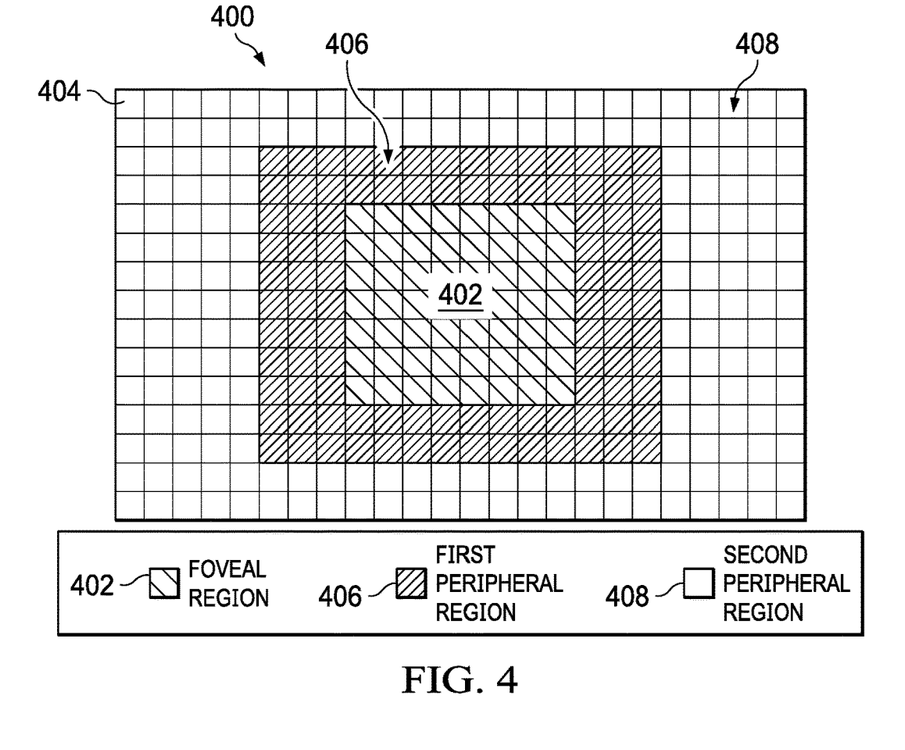
FIG. 4 is a diagram illustrating a foveated image having a foveal region and a plurality of peripheral regions in accordance with some embodiments of the present disclosure.

Although the example of FIG. 3 depicts a single peripheral region 306, in some embodiments of the present disclosure the pixels of the pixel array outside of a foveal region are partitioned into a plurality of peripheral regions. To illustrate, FIG. 4 depicts an example pixel array 400 of an image in which a foveal region 402 is specified as an 8×7 array subset of pixels 404 in the illustrated position, and the remaining pixels 404 of the pixel array 400 are divided into two concentric peripheral regions: a first peripheral region 406 surrounding the foveal region 402, and a second peripheral region 408 surrounding the first peripheral region 406 and farther from the foveal region 402 than the first peripheral region 406. In other embodiments, there may be additional concentric peripheral regions intermediate the first peripheral region and the second peripheral region or outside the second peripheral region. In instances where there are multiple peripheral regions, a display image may be foveally rendered such that the resulting contrast implemented within each peripheral region decreases with the distance from the foveal region. For example, with respect to FIG. 4, the foveal region will be rendered at an original contrast of the image to be displayed, the first peripheral region will be rendered at a first contrast lower as compared to the original contrast, and the second peripheral region will be rendered at further reduced second contrast lower than the first contrast. The contrast of the displayed image according to embodiments generally decreases with distance from the foveal region. When motion ceases, the foveal region, the first peripheral region, and the second peripheral regions are rendered with the original contrast of the image to be displayed.

Figure 5:
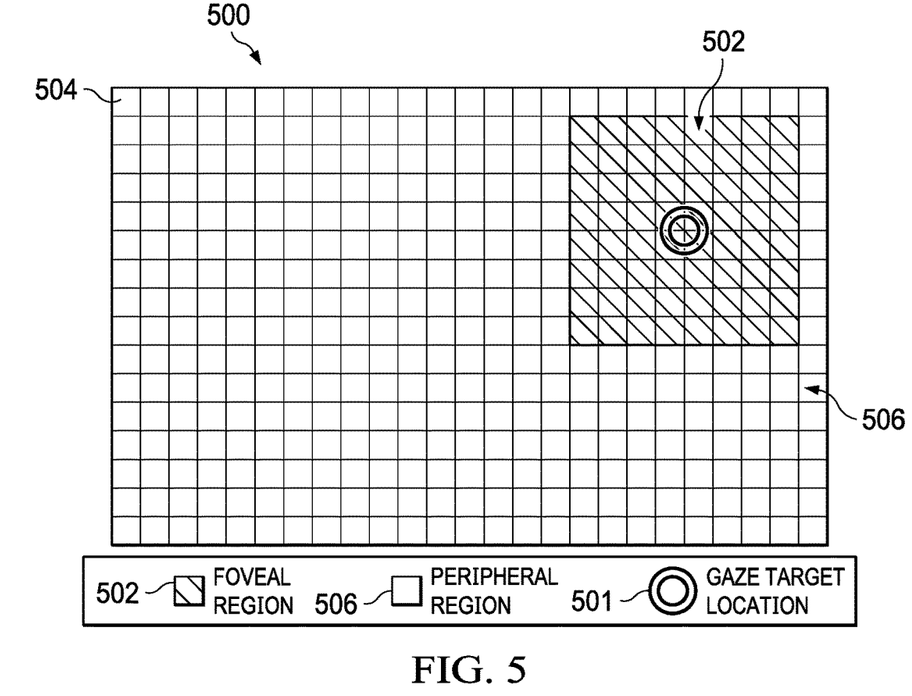
FIG. 5 is a diagram illustrating a foveated image having a dynamically-located foveal region based on eye gaze tracking in accordance with some embodiments of the present disclosure.

In other embodiments, the HMD device 102 may employ a gaze tracking system that tracks the gaze direction of one or both of the user's eyes, and from this dynamically updates the location that is the target of the user's gaze in the pixel array of the corresponding display panel (this location being referred to herein as the "gaze target location"), and thus updates the location of the foveal region that is based on the gaze target location. To illustrate, FIG. 5 depicts an example pixel array 500 of an image to be rendered in which a gaze tracking system identifies the user's gaze direction and from this estimates a location 501 in a pixel array of a corresponding display panel as the current gaze target location. On this basis, the rendering system may designate, for example, an 8×8 array subset of pixels 504 centered around this location 501 as a foveal region 502 and designate the remaining pixels 504 as a peripheral region 506 for the image to be rendered. Alternatively, the remaining pixels 504 may be partitioned into more than one peripheral region, as described above with reference to FIG. 4. In this way, the foveal region 502 is projected onto the user's retina with approximate alignment of the foveal region 502 to the user's fovea. Once again though, according to embodiments described herein, the foveal region will be rendered at an original contrast of the image to be displayed, and the peripheral region(s) will be rendered at a lower contrast compared to the original contrast, with the contrast of each peripheral region generally decreasing with distance from the foveal region.

The dimensions of a foveal region (as measured in pixels) may be based on a number of factors, including the overall resolution of the corresponding pixel array of the display panel, the number of different peripheral regions to be implemented, the distance between the display panel and the user's eye, the presence of any lenses or other optical systems between the pixel array and the user's eye, and their effect on the user's perception of the display, and the like. To illustrate, assuming that foveal vision occurs inside an area +/−5 degrees horizontal and +/−5 degrees vertical of the optical axis of the eye, a foveal region may be dimensioned to cover this foveal field of view, and further may include some additional margin. In implementations utilizing gaze tracking to dynamically select a position of the foveal region, the amount of margin to be included may be based on the potential error in estimating the gaze direction of the eye. To illustrate, for the example of FIG. 5, it may be assumed that a region of 6×6 pixels represents the foveal field of view, and there is a margin of error in gaze tracking in the horizontal direction that is compensated for by adding two columns of pixels and two rows of pixels on the sides of the 6×6 region (assume negligible vertical eye tracking error in this example), and thus resulting in the example foveal region 502 dimensioned at 8 pixels×8 pixels. It should be noted that the foregoing illustrations are simplified for ease of description. In a typical implementation, a foveal region of +/−5 degrees in horizontal and vertical directions, with an acuity of 1 min of arc per pixel, would require 60 pixels per degree so that the total size of the foveal area would be 600×600 pixels.

With the location and dimensions of a foveal region identified (as well as the location and dimensions of the one or more peripheral regions identified as a result), the processing system 200 renders the next display image using a foveal rendering process that renders the resulting display image with original contrast within the region corresponding to the foveal region and lower contrast(s) than the original contrast within the one or more peripheral region(s).

In various embodiments of the present disclosure, the foveal area may encompass an area fifty-five degrees on either side of the optical axis of the eye of the user, an area sixty degrees on either side of the optical axis of the eye of the user, an area eighty degrees on either side of the optical axis of the eye of the user, or an area ninety degrees on either side of the optical axis of the eye of the user. In general, the foveal area is dimensioned so that the edge of the low contrast peripheral area with the foveal area is not noticeable or barely noticeable to the user of the HMD.

As described above, Visually Induced Motion Sickness (VIMS) is a major problem with HMD used in VR or AR.

VIMS is particularly impactful when the user's head is turned quickly and thus creating fast motion in the display. VIMS, which is presumed to be caused due to mismatch between the vestibularly-sensed head movement and the corresponding visual effect, is also known to be worse with wider field of view display/displayed. It has been shown before that shrinking the extent of the display by darkening (i.e., completely obscuring) the peripheral portions of the display during head motion reduced VIMS. However, reducing the field of view by darkening the image results in an observed area of dark periphery which reduces the sense of presence. Accordingly, embodiments of the display system 100 described herein propose reducing the contrast smoothly instead of lowering the brightness completely in the peripheral portions of the display. To address the issues of VIMS, during motion of the HMD the peripheral regions of an image may be displayed with low contrast versions of an original image to be displayed. The proposed embodiments thus preserve presence better than prior art methodologies and should reduce VIMS further while maintaining presence.

The contrast of an image during HMD motion also may be reduced by an asymmetric restriction of the contrast considering the asymmetry of object appearance and disappearance on both sides of the display. Specifically, for example, if the head of the user of the HMD is turning to the left, the right side of the display is moving previously visible content outside of the field of view to the right. The previously visible image part being moved outside the field of view was previously seen more centrally, so there is higher level of awareness of that image part in the visual system of the user. Therefore, it is beneficial to avoid suppressing the contrast too much or alternatively reducing the field on the right side of the display too much as that will be sensed by the user and will reduce the presence/immersion of the user. On the other side of the display relative to the optical axis of the eye of the user, the left side of the display, there will be coming into view new parts of the scene not previously observed. However, there is no expectation for the new part of the scene to be of any specific contrast or visibility or shape. Therefore, on that left side of the display (i.e., incoming view of the user), the reduction in field of view can be stronger essentially reducing the contrast of the incoming view much more and farther centrally to near the foveal area as compared to the outgoing view.

Figure 6:
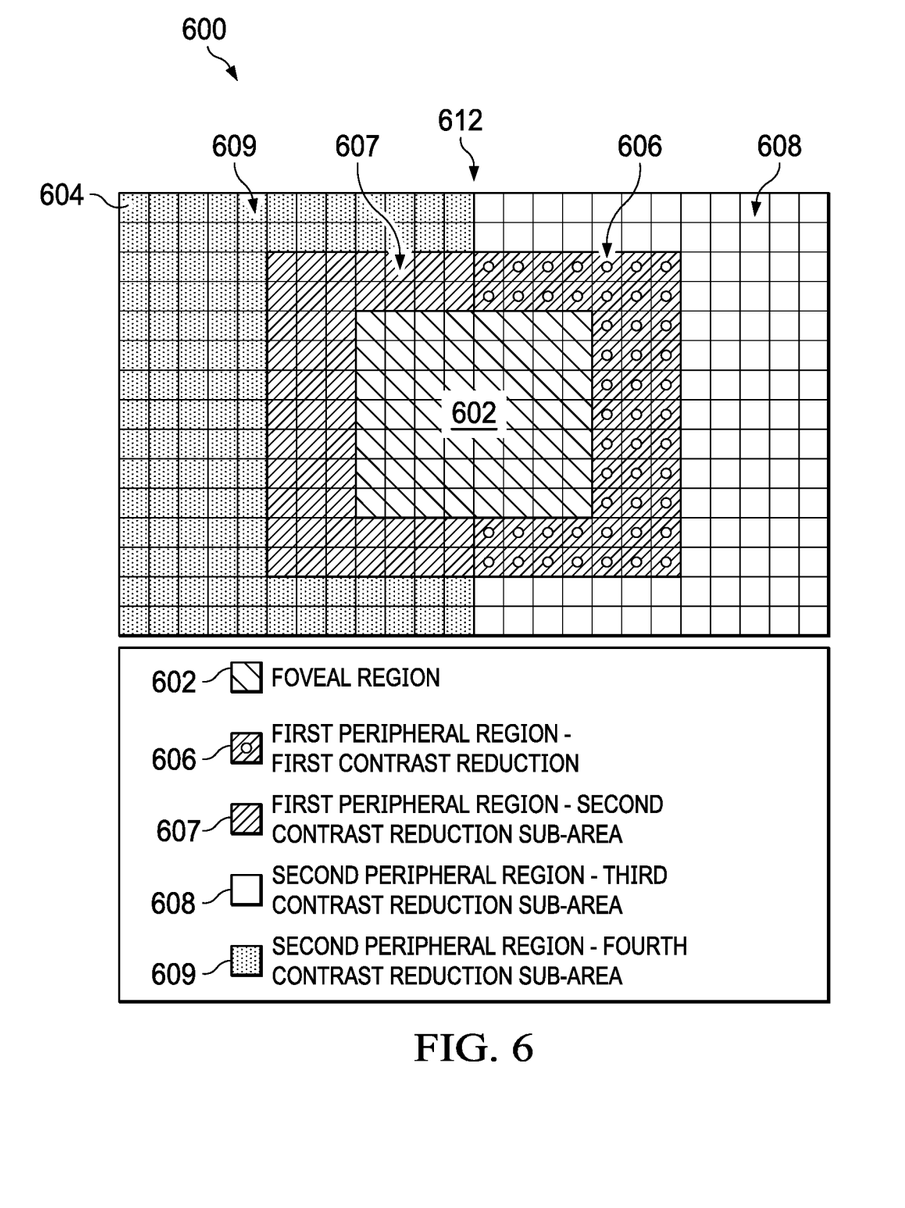
FIG. 6 is a diagram illustrating a foveated image having a foveal region and a plurality of peripheral regions with sub-areas in accordance with some embodiments of the present disclosure.

To illustrate asymmetric reduction of contrast relative to an optical axis of an eye of a user, FIG. 6 depicts an example pixel array 600 of an image in which a foveal region 602 is specified as an 8×7 array subset of pixels 604 in the illustrated position, and the remaining pixels 604 of the pixel array 600 are divided into two concentric peripheral regions: a first peripheral region (formed by first sub-area 606 and second sub-area 607) surrounding the foveal region 602, and a second peripheral region (formed by third sub-area 608 and fourth sub-area 609) surrounding the first peripheral region and farther from the foveal region 602. In other embodiments, there may be additional peripheral regions intermediate the first peripheral region and the second peripheral region or outside the second peripheral region that are not illustrated here for ease of understanding. In instances where there are multiple peripheral regions, a display image may be foveally rendered such that the resulting contrast implemented within each peripheral region decreases with the distance from the foveal region asymmetrically on either side of the line of sight of the user 612.

For example, with respect to FIG. 6, if the head is turning to the left, the foveal region 602 can be rendered at an original contrast of the image to be displayed, the first peripheral region can be rendered at a first contrast lower compared to the original contrast with the first sub-area 606 and second sub-area 607 of the first peripheral region having their contrast reduced by differing amounts. In particular, for head motion to the left, the first sub-area 606 may have its contrast reduced by a lesser amount that the second sub-area 607; this provides lesser contrast reduction in the peripheral region(s) in which the user has a higher prior level of awareness of the image. Alternatively, lesser contrast reduction may occur in peripheral region(s) corresponding the image portion newly coming into view such that for motion to the left the second sub-area 607 may have its contrast reduced by a lesser amount that the first sub-area 606.

Similarly, and third sub-area 608 and fourth sub-area 609 of the second peripheral region will be rendered at still lower contrasts compared to the second peripheral sub-areas, with the contrast of the third sub-area 608 lower than the contrast of the first sub-area 606 and the contrast of the fourth sub-area 609 lower than the contrast of the third sub-area 608. The contrast of the displayed image generally decreases with distance from the foveal region.

When motion ceases, the foveal region, and the first and second sub-areas 606, 607 of the first peripheral region and the third and fourth sub-areas 608, 609 of the second peripheral regions are rendered with the original contrast of the image to be displayed. The restoration of contrast may occur abruptly or smoothly in the temporal domains. In the temporal domain, all peripheral regions may be restored to original contrast at a same time immediately after motion ceases (i.e., abruptly) or the contrast of the peripheral regions may be restored to original contrast incrementally over time (i.e., smoothly) after the motion ceases. While a direction of the motion to the left is described with particularity, the direction of motion can be one of left, right, up, down, forward, backward or a combination thereof with consequent change to the asymmetric contrast reduction based on the direction of motion. When the movement of the HMD stops, the increased contrast in the periphery regions will feel natural to the user and will have minimal motion and therefore reduce VIMS with increased immersion.

One potential advantage of the methodology or the present disclosure is that it may also help with the computational cost. When the head/HMD moves, the computational cost to render images is increased; the rendered image has to be recalculated and may need to be rendered faster to keep up with the motion of the HMD. With embodiments of the present disclosure described herein, the size of the image being computed and rendered may be reduced so that the overall computation cost may be reduced or maintained at a similar level when the head is moving as when the head is static.

It is also noted that the transition from full contrast rendering "centrally" in the foveal area to the lower contrast peripheral regions may be done abruptly or smoothly in one or both of the spatial and temporal domain. A transition after motion begins may occur in the spatial domain based on distance from the foveal region. A transition may occur in the temporal domain based on the time from when the head motion begins. The transition may be abrupt spatially when peripheral regions are reduced from original contrast in visible incremental steps between abutting or adjacent regions (e.g., the transition from the foveal region to a first peripheral region, the transition from a first peripheral region to a second peripheral region, etc.). The transition may be smooth spatially when peripheral regions are reduced from original contrast based on distance from the foveal region such that contrast reduction is continuous and consistent between adjacent regions. The transition may be abrupt temporally when the reduction in contrast occurs immediately after the motion begins. The transition may be smooth temporally when the reduction in contrast occurs over increments of time beginning after the motion begins. Whether the transition is abrupt or smooth may vary depending on the content to be displayed or other factors. In general, the reduction of contrast in response to motion of the HMD should go down more slowly/less sharply while the reinstatement of contrast upon cessation of HMD motion should be more abrupt as soon as the head motion stops. The reason for this feature of the methodology is because the biological visual system of a user is used to the fast reinstating of contrast when eye movements stop and that the sharply contrasting image masks any prior image including a blank/low contrast image and erases the prior image from the visual/iconic memory of the user.

The low contrast image peripherally can be implemented by "blurring" these peripheral portions of the image. Blurring has the advantage of potentially reducing aliasing. Aliasing may be a mechanism of VIMS as it may create a false movement in terms of direction or speed which may trigger the conflict resulting in VIMS. Thus, one or more embodiments of the present disclosure may avoid peripheral aliasing not just suppress peripheral imaging. Within the context of a foveating system, the peripheral region is going to be compressed to low resolution and can be kept at that level in reducing the contrast.

In addition to applying reduced contrast during user movements detected by the sensors of the IMU, a similar benefit may be gained by restricting the field of view during image motion from camera rotation or panning in personal viewing applications. This type of motion can be detected directly from the image compression coding. The discussion above addresses the head turning/rotation/3 Degrees of Freedom case. Similar reduction in contrast in peripheral region(s) can be performed for motion within Six Degrees of Freedom (6DOF) cases. It is noted that lateral head motion can be even more problematic for VIMS even if there is no delay due to distortions. Therefore, a similar restriction of the field of view to that described above can be provided during such movements.

Figure 7:
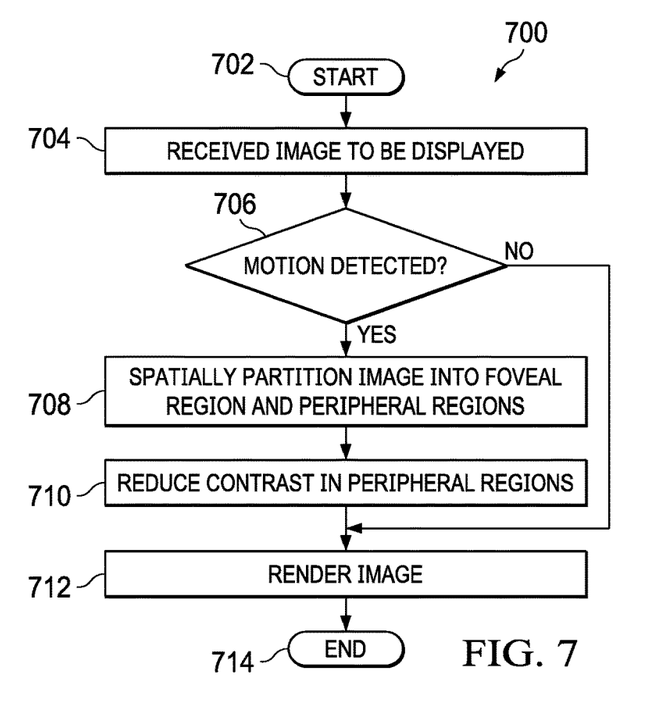
FIG. 7 is a flow diagram illustrating an operation of an HMD to reduce contrast of peripheral regions of a displayed image in response to motion of the HMD in accordance with some embodiments of the present disclosure.

FIG. 7 is a flow diagram illustrating an operation of an HMD to reduce contrast of peripheral regions of a displayed image in response to motion of the HMD in accordance with at least one embodiment of the present disclosure. The method 700 starts at block 702. As described above, in response detection of motion of the head of a user of a HMD, contrast is reduced in a peripheral area of an image displayed to the user from an original contrast of the image. The image has a foveal area and at least one peripheral area relative to the optical axis of the eye of the user. The contrast is least reduced in a first portion of the peripheral area closest the foveal area and most reduced in a second portion of the peripheral area farthest from the foveal area. Thus, at block 704, the one or more application processors 204 receive the image/frame to be displayed.

At block 706, motion of the head of the user of the HMD is detected via sensor hub 208 and IMU 210. For example, sensor readings from the gyroscope 218 may indicate that the HMD is in motion. The direction of the motion may be at least one of left, right, up, down, forward, or backward. If motion of the HMD is not detected, the methodology jumps to block 712. If motion of the HMD is detected, the methodology continues to block 708.

At block 708, the one or more application processors 204 of the HMD spatially partitioned the image into a foveal region that corresponds to a user's gaze direction with respect to the pixel array (e.g., pixel array 242 or 252) of the corresponding display panel on which the image is to be displayed, as well as plurality of peripheral regions surrounding the foveal region. The foveal area may encompass an area fifty-five degrees on either side of the optical axis of the eye of the user, an area sixty degrees on either side of the optical axis of the eye of the user, an area eighty degrees on either side of the optical axis of the eye of the user, or an area ninety degrees on either side of the optical axis of the eye of the user.

At block 710, the contrast of the peripheral regions of the image to be displayed is reduced from the original contrast of the image received. As described above, the reduction of contrast may be asymmetric with respect to the optical axis of the eye of the user based on a direction of the motion. The transition from the foveal area having the original contrast to the first peripheral area having reduced contrast may be abrupt or smooth in the spatial domain or the temporal domain. The rate of reduction of the contrast over peripheral area/s of the displayed image can be based on a speed of the motion as determined by the one or more application processors from information from the IMU.

At block 712, the image is rendered. If there was no motion detected, the image rendered is the image as received with original contrast. If motion had been detected, the image rendered is a modified image from the image received, with the foveal area of the image rendered with original contrast and the peripheral regions of the image rendered with reduced contrast relative to the original contrast for that peripheral portion of the image to be displayed. At block 714, the method ends When rendering another next image, the one or more application processors will perform the same methodology and if no motion is detected, render the next image with the original contrast with which it was received. Accordingly, in response to a cessation of the motion, the contrast is increased in at least a first portion of the first peripheral area/s to a higher contrast, namely the original contrast of the image.

In one embodiment, a method according to the present disclosure includes detecting, by one or more processors of a HMD, motion of the HMD. The method also includes, for an image having an original contrast, rendering on the display in a first area within a foveal view of a user of the HMD and in response to the motion, a first portion the image with the original contrast. The method further includes rendering on the display in at least a portion of a second area within a peripheral view of the user and in response to the motion, a second portion of the image with reduced contrast compared to original contrast, wherein the contrast is most reduced in the at least a portion of the second area closest the outer edge of the peripheral view of the user and least reduced in the at least a portion of the second area closest the foveal view of the user.

In one embodiment, the reduction of the contrast of the second area is asymmetric with respect to an optical axis of an eye of the user that bisects the foveal view of the user based on a direction of the motion.

In another embodiment, a method includes detecting, using one or more sensors of a HMD, motion of a head of a user of the HMD; and in response to detection of the motion, gradually reducing from an original contrast, contrast of an image presented on a display of the HMD in at least a portion of an area ranging from proximate a foveal view of the user to proximate an outer edge of the peripheral view of the user, wherein the gradually reducing contrast is such that the contrast is less reduced in the at least a portion of the area closest to an edge of the foveal view of the user and more reduced in the at least a portion of the area closest to the outer edge of the peripheral view of the user.

In one embodiment, the gradually reducing contrast is asymmetric with respect to the foveal view of the user, with sub-areas of the at least a portion of the area located on opposite sides of the optical axis of the eye of the user having respective contrasts reduced by different amounts.

The direction of the motion is may be left, right, up, down, forward, backward.

In one embodiment, in response to a cessation of the motion, the contrast of the at least a portion of the area is increased to the original contrast.

In yet another embodiment, a method of displaying images to a user of a head mounted display (HMD) includes detecting motion of a head of the user of the HMD; and in response to the motion, reducing contrast in two or more peripheral areas of an image displayed to the user from an original contrast of the image, the image having a foveal area and the two or more peripheral areas relative to the optical axis of the eye of the user, the contrast being least reduced in at least a first portion of a first peripheral area closest the foveal area and being most reduced in at least a second portion of a second peripheral area farthest from the foveal area.

In one embodiment, the reduction of contrast may be asymmetric with respect to the optical axis of the eye of the user based on a direction of the motion. The direction of the motion is at least one of left, right, up, down, forward, backward.

In one embodiment, in response to a cessation of the motion, the contrast of the at least a first portion of the first peripheral area and the at least a second portion of the second peripheral area of the displayed image are increased to a higher contrast.

In one embodiment, a rate of reduction of the contrast over the at least a portion of the first peripheral area and the second peripheral area of the displayed image is adjusted based on a speed of the motion.

In one embodiment, a transition from the foveal area having the original contrast to the first peripheral area having reduced contrast is one of abrupt or smooth between adjacent areas in one or more of a spatial domain based on distance from the foveal area or a temporal domain based on initial time of the motion.

In one embodiment, a change in contrast from an internal edge of the at least a first portion of the first peripheral area closest the foveal area to the foveal area is smooth or hard.

In one or more embodiment, the foveal area encompasses an area fifty-five degrees on either side of the optical axis of the eye of the user, an area sixty degrees on either side of the optical axis of the eye of the user, an area eighty degrees on either side of the optical axis of the eye of the user or an area ninety degrees on either side of the optical axis of the eye of the user.

In another embodiment, a HMD for displaying images to a user includes a sensor unit for detecting motion of a head of the user of the HMD; and one or more processors for, in response to the motion, reducing contrast in a plurality of peripheral area of an image displayed to the user from an original contrast of the image, the image having a foveal area and at least first and second peripheral areas relative to the optical axis of the eye of the user, the contrast being least reduced in at least a first portion of the first peripheral area closest the foveal area and being most reduced in at least a second portion of the second peripheral area farthest from the foveal area.

In one embodiment, the one or more processors are configured to reduce contrast asymmetrically with respect to the optical axis of the eye of the user based on a direction of the motion. The direction of the motion is at least one of left, right, up, down, forward, or backward.

In one embodiment, the HMD includes a display for displaying the image. In one embodiment, the one or more processors are configured to, in response to a cessation of the motion, increase the contrast of the plurality of peripheral areas of the displayed image to a higher contrast.

In one embodiment, the one or more processors are configured adjust a rate of reduction of the contrast over the at least a first portion of the first peripheral area and the at least a second portion of the second peripheral area of the displayed image based on a speed of the motion.

In various embodiments, a transition from the foveal area having the original contrast to the first peripheral area having reduced contrast is one of abrupt or smooth between adjacent areas in one or more of a spatial domain based on distance from the foveal area or a temporal domain based on initial time of the motion.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    detecting, using one or more processors of a head mounted display (HMD), motion of the HMD; and
    for an image having an original contrast:
        rendering on a display of the HMD in a first area within a foveal view of a user of the HMD and in response to the motion, a first portion of the image with the original contrast; and
        rendering on the display in at least a portion of a second area within a peripheral view of the user and in response to the motion, a second portion of the image with gradually reduced contrast compared to the original contrast, wherein contrast is most reduced in the at least a portion of the second area within the peripheral view and closest to an outer edge of the peripheral view of the user and least reduced in the at least a portion of the second area within the peripheral view and closest the foveal view of the user.

2. The method of claim 1, wherein reduction of contrast of the second area within the peripheral view is asymmetric with respect to an optical axis of an eye of the user that bisects the foveal view of the user based on a direction of the motion.

3. A method comprising:
    detecting, using one or more sensors of a head mounted display (HMD), motion of a head of a user of the HMD; and
    in response to detection of the motion, gradually reducing from an original contrast, contrast of an image presented on a display of the HMD in at least a portion of a peripheral view area ranging from proximate a foveal view of the user to proximate an outer edge of the peripheral view of the user, wherein the gradually reducing contrast is such that the contrast is less reduced in the at least a portion of the peripheral view area closest to an edge of the foveal view of the user and more reduced in the at least a portion of the peripheral view area closest to the outer edge of the peripheral view of the user.

4. The method of claim 3, wherein the gradually reducing contrast is asymmetric with respect to the foveal view of the user, with sub-areas of the at least a portion of the peripheral view area located on opposite sides of an optical axis of an eye of the user having respective contrasts reduced by different amounts.

5. The method of claim 3, wherein a direction of the motion is one or more of a group consisting of left, right, up, down, forward, backward.

6. The method of claim 3, further comprising
    in response to a cessation of the motion, increasing the contrast of the at least a portion of the peripheral view area to the original contrast.

7. A method of displaying images to a user of a head mounted display (HMD), the method comprising:
    detecting motion of a head of the user of the HMD; and
    in response to the motion, reducing contrast in two or more peripheral areas of an image displayed to the user from an original contrast of the image, the image having a foveal area and the two or more peripheral areas relative to an optical axis of an eye of the user, the contrast being least reduced in at least a first portion of a first peripheral area closest the foveal area, being most reduced in at least a second portion of a second peripheral area farthest from the foveal area, and being gradually reduced between the first portion of the first peripheral area and the second portion of the second peripheral area.

8. The method of claim 7, wherein the reducing contrast is asymmetric with respect to the optical axis of the eye of the user based on a direction of the motion.

9. The method of claim 7, further comprising
    in response to a cessation of the motion, increasing the contrast of the at least a first portion of the first peripheral area and the at least a second portion of the second peripheral area of the displayed image to a higher contrast.

10. The method of claim 7, further comprising
    adjusting a rate of reduction of the contrast over the at least a portion of the first peripheral area and the second peripheral area of the displayed image based on a speed of the motion.

11. The method of claim 7, wherein a transition from the foveal area having the original contrast to the first peripheral area having reduced contrast is one of abrupt or smooth between adjacent areas in one or more of a spatial domain based on distance from the foveal area or a temporal domain based on initial time of the motion.

12. The method of claim 7, wherein a change in contrast from an internal edge of the at least a first portion of the first peripheral area closest the foveal area to the foveal area is smooth or hard.

13. The method of claim 7, wherein the foveal area encompasses one of: an area fifty-five degrees on either side of the optical axis of the eye of the user; an area sixty degrees on either side of the optical axis of the eye of the user; an area eighty degrees on either side of the optical axis of the eye of the user; and an area ninety degrees on either side of the optical axis of the eye of the user.

14. A head mounted display (HMD) for displaying images to a user, the HMD comprising:
    a sensor unit configured to detect motion of a head of the user of the HMD; and one or more processors configured to, in response to the motion, reduce contrast in a plurality of peripheral areas of an image displayed to the user from an original contrast of the image, the image having a foveal area and at least first and second peripheral areas relative to an optical axis of an eye of the user, the contrast being least reduced in at least a first portion of the first peripheral area closest the foveal area, being most reduced in at least a second portion of the second peripheral area farthest from the foveal area, and being gradually reduced between the first portion of the first peripheral area and the second portion of the second peripheral area.

15. The HMD of claim 14, wherein the one or more processors are configured to reduce contrast asymmetrically with respect to the optical axis of the eye of the user based on a direction of the motion.

16. The HMD of claim 15, wherein the direction of the motion is at least one of left, right, up, down, forward, or backward.

17. The HMD of claim 14, further comprising:
a display configured to display the image.

18. The HMD of claim 14, wherein the one or more processors are configured to, in response to a cessation of the motion, increase the contrast of the plurality of peripheral areas of the displayed image to a higher contrast.

19. The HMD of claim 14, wherein the one or more processors are configured to adjust a rate of reduction of the contrast over the at least a first portion of the first peripheral area and the at least a second portion of the second peripheral area of the displayed image based on a speed of the motion.

20. The HMD of claim 14, wherein a transition from the foveal area having the original contrast to the first peripheral area having reduced contrast is one of abrupt or smooth between adjacent areas in one or more of a spatial domain based on distance from the foveal area or a temporal domain based on initial time of the motion.

* * * * *